April 12, 1960     E. L. DODD     2,932,483
WEIGHING MACHINE

Filed Dec. 10, 1956     3 Sheets-Sheet 1

INVENTOR.
Edmund L. Dodd
BY Robert P. Churchill
ATTORNEY

April 12, 1960

E. L. DODD 2,932,483

WEIGHING MACHINE

Filed Dec. 10, 1956

INVENTOR.
Edmund L. Dodd

BY Robert P. Churchill

ATTORNEY

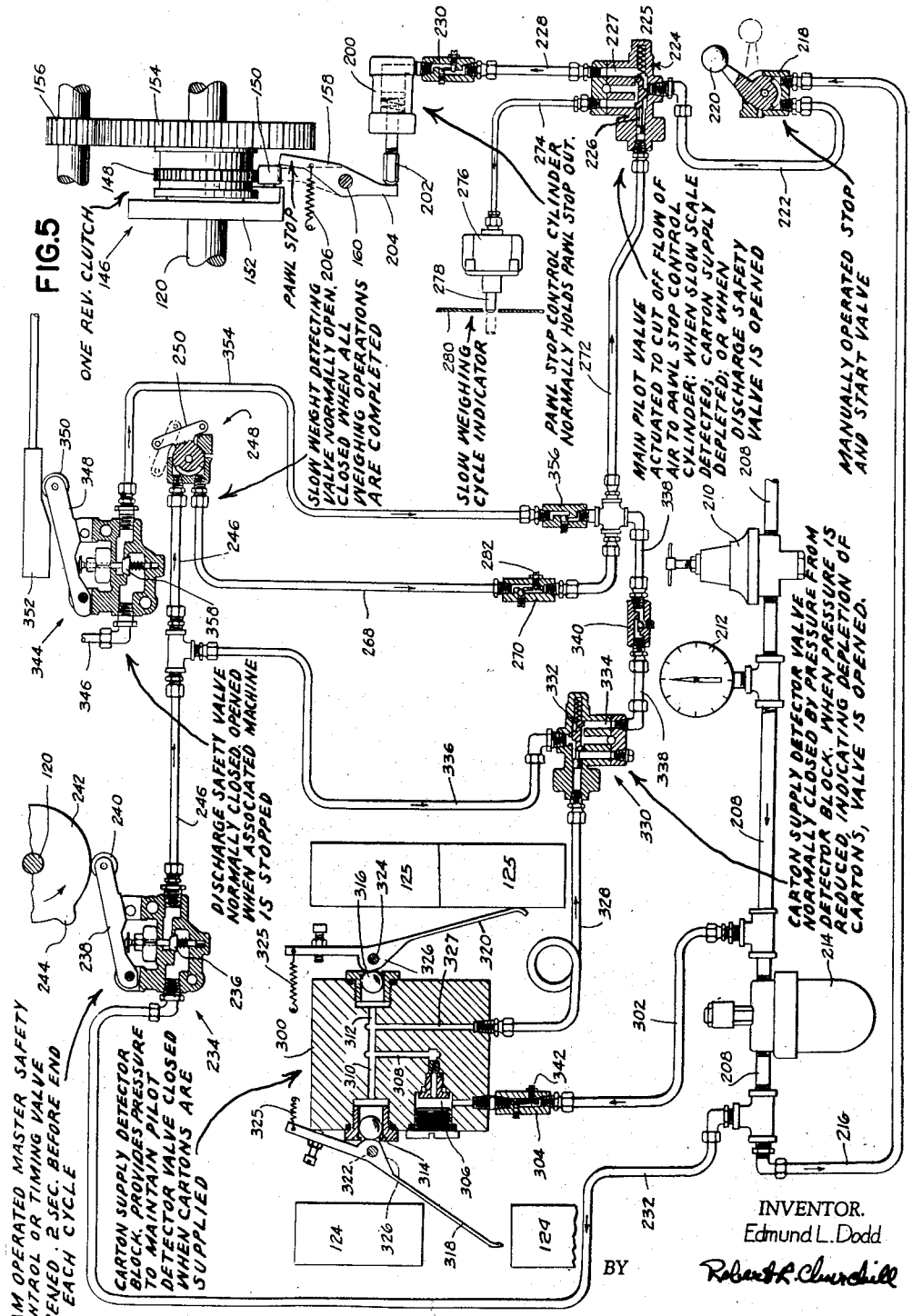

United States Patent Office 2,932,483
Patented Apr. 12, 1960

2,932,483

WEIGHING MACHINE

Edmund L. Dodd, Quincy, Mass., assignor to Pneumatic Scale Corporation, Limited, Quincy, Mass., a corporation of Massachusetts Application December 10, 1956, Serial No. 627,306

14 Claims. (Cl. 249—18)

This invention relates to a weighing machine and more particularly to a control mechanism for an automatic weighing machine.

The invention has for an object to provide a novel and improved multi-unit automatic weighing machine having novel air actuated control mechanism which is extremely sensitive and positive in action and efficient in operation and which is of particular advantage for use in a packaging plant where the atmosphere may be charged with explosive dust from the product being packaged or from other causes and which may comprise a hazard when electrical controls embodying arcing switch contacts are employed.

With this general object in view and such others as may hereinafter appear the invention consists in the automatic weighing machine and control means therefor and in the various structures, arrangements and combinations of parts hereinafter described and particularly defined in the claims at the end of this specification.

In the drawings illustrating the preferred embodiment of the invention:

Fig. 5 is a diagrammatic view of the air actuated control means embodied in the present weighing machine.

Figure 1:
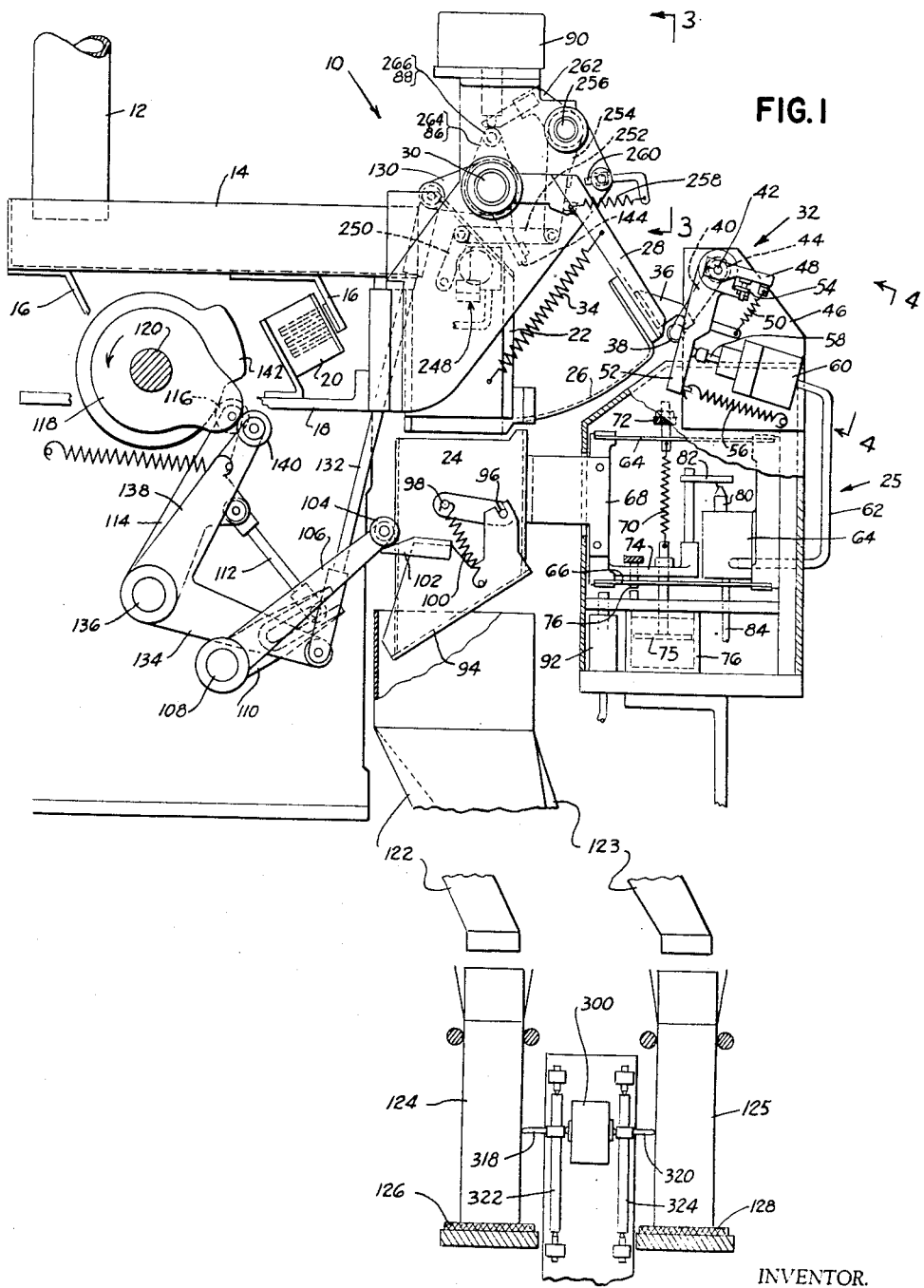
Fig. 1 is a side elevation partly in cross section illustrating the essential elements of a net weight weighing machine embodying the present control means.

In general the present invention contemplates novel control means for a multi-unit automatic net weight weighing machine of the same general type illustrated and described in the United States patents to Stanley R. Howard, No. 2,364,902, issued December 12, 1944, and to Thomas P. Howard, No. 2,704,197, issued March 15, 1955. In such prior weighing machines each unit includes mechanism for withdrawing the material to be weighed from a bulk supply thereof and for weighing the same in a receptacle mounted on a weighing element whereupon the weighed load is released from the receptacle into a container supported upon a conveyer disposed beneath the weighing unit.

Such prior weighing machines operate to perform the weighing operations in successive cycles, and in accordance with the present invention the weighing machine is provided with air actuated controls for temporarily discontinuing the cycling operation in the event that one or more weighing units fails to complete its weighing operation within a predetermined time during a cycle of operation, and for also assuring that a new group of containers is advanced into filling position to receive the weighed loads completed during the previous cycle of operation. In practice the filled containers are discharged to a succeeding associated machine in the packaging line for performing subsequent operations thereon, such as a top closing and sealing machine, not shown, for closing and sealing the top flaps of the filled container, and provision is also made for discontinuing the operation of the weighing machine in the event that such associated machine in the line is stopped whereby to prevent an accumulation and consequent jamming of the filled containers being discharged.

It will be appreciated that the provision of air actuated controls in addition to providing a sensitive, powerful and efficient control mechanism is particularly adapted for use in a weighing machine operating in an explosive atmosphere caused by comminuted material being weighed and packaged, or by other causes, and reduces to a minimum the liability of explosion such as might be caused by electrical controls embodying arcing switches. As an additional precaution all electrical equipment employed in the machine is preferably of the explosion-proof type.

Referring now to the drawings, 10 represents an individual net weight weighing unit of a multi-unit net weight weighing machine of the same general type illustrated and described in the Thomas P. Howard patent, No. 2,704,197. As herein shown, the supply of material to be weighed is delivered from a source of supply through a supply tube 12 into a vibratory feeder, indicated generally at 14. The vibratory feeder may be supported upon thin steel straps 16 mounted on a bracket 18 attached to the machine frame and is arranged to be vibrated by an electrically operated vibratory motor 20 operatively connected between the bracket and the feeder 14 to effect advance of the material through the feeder in a substantially uniform stream. The vibratory motor 20 may be totally enclosed, as illustrated, to render it explosion-proof.

The vibratory feeder 14 is arranged to be vibrated during the weighing operation to feed a substantially uniform stream of material through a hopper 22 and directly into a load receiving or weighing receptacle 24 carried by a weighing element indicated generally at 25. The hopper 22 is provided with a material cutoff shutter comprising a curved plate 26 attached to an arm 28 pivotally mounted on a rocker shaft 30 supported in the machine frame. The shutter 26 is arranged to be latched in its open position during the weighing operation by latching mechanism indicated generally at 32, and when the material deposited in the weighing receptacle 24 reaches a predetermined weight, provision is made for releasing the shutter to permit it to be rocked by a spring 34 to its closed position to thereby cut off the stream of material.

Figure 4:
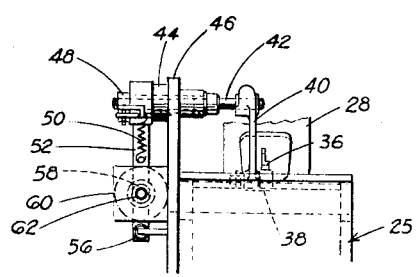
Fig. 4 is a detail view in front elevation of another portion of the machine shown in Fig. 1 as viewed from the line 4—4.

As illustrated in Figs. 1 and 4, the latching mechanism 32 includes a hooked latch element 36 carried by the shutter arm 28 which is arranged to engage a roller 38 carried by an arm 40 fast on a rocker stud 42 mounted for independent rocking movement within a sleeve or bearing member 44 secured to a frame member 46. A second arm 48 fast on the stud 42 is connected by a spring 50 to an actuating arm 52 pivotally mounted on the sleeve bearing 44. The spring 50 tends to urge the roller 38 into operative engagement with the hooked latch member 36, and the roller arm 40 may be adjustably limited in its movement by an adjusting screw 54 carried by an extension from the actuating arm 52 and engageable with the arm 48. In practice the arm 40 may be adjusted to present its roller 38 slightly beyond dead center relative to the engaging portion of the hooked latch element 36 as shown. The arm 52 is spring urged in a counterclockwise direction by a spring 56 and is held in its latching position by a piston 58 forming part of an air cylinder 60. The air cylinder 60 is operatively connected by an air conduit 62 to a pneumatically operated control unit indicated generally at 64 forming a part of the weighing unit 25 and responsive to movement of the weighing element when a predetermined weight is deposited in the weighing receptacle 24.

The weighing element indicated at 25 may comprise the cantilever spring beam weighing element illustrated and described in the Thomas P. Howard patent, No. 2,704,197, to which reference may be had, and which, as herein shown, consists essentially in a four bar parallel linkage wherein the top and bottom horizontal links 64, 66 respectively comprise cantilever leaf springs of equal length rigidly connected at one end and connected by a rigid link 68 at the other end to which the weighing receptacle 24 is attached. A coil spring 70 having its upper end adjustably secured to a supporting member 72 has its lower end secured to an arm 74 projecting from and forming a part of the link 68 and serves to exert a counterforce upon the weighing element counteracting the weight of the receptacle and associated parts. A stop stud 76 carried by the arm 74 is engageable with upper and lower stationary members for limiting the vertical movement of the weighing element, and a depending extension from the arm 74 comprises a piston 75 operating in a dash pot 76 mounted on the machine frame.

The pneumatically operating unit 64 secured to the frame of the machine preferably comprises a pressure responsive amplification device having a primary and a secondary air circuit as fully illustrated and described in the T. P. Howard patent, No. 2,704,197, and is adapted to effect rapid tripping of the latch mechanism upon minute deflection of the cantilever spring beam unit. As herein shown, the pneumatically operated unit is provided with a jet member 80 arranged to cooperate with a valve member 82 carried by and movable with the weighing unit. The construction of the pneumatically operated unit is such that a large pressure change occurs upon minute movement of the valve member toward the jet orifice when the weighing element is deflected through a correspondingly minute distance. Air may be supplied to the primary and secondary air circuits of the pneumatically operated unit 64 from any usual or preferred regulated source through a supply pipe 84, and in operation the air from the secondary circuit passes through the pipe 62 to the air cylinder 60 to maintain the piston 58 in its extended position and hold the latching mechanism 32 in its latched position. In operation when a predetermined weight of material is deposited in the receptacle 24 deflection of the spring beam effects an increase in the pressure of the primary circuit which in turn effects a rapid reduction in air pressure in the secondary air circuit and thus permits rapid retraction of the piston 58 and rocking of the arm 52 in a counterclockwise direction by the spring 56. Through the stop screw connection 54 the arm 40 is thus positively rocked in a counterclockwise direction to release the hooked latch member 36 from the roller 38, thus permitting rocking of the shutter 26 to a closed position to cut off the feed of the material.

Figure 3:
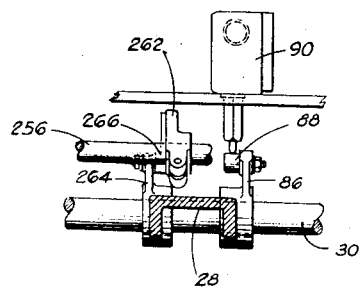
Fig. 3 is a detail view in front elevation of a portion of the machine shown in Fig. 1 as viewed from the line 3—3 of Fig. 1.

As shown in Figs. 1 and 3, the shutter arm 28 is provided with an integral arm 86 carrying a roller 88 for cooperation with an explosion-proof switch 90 arranged to open a circuit to the vibratory motor 20 so that in operation when the shutter is closed the feed of the material to the hopper 22 is discontinued.

Upon completion of the weighing operation the weighing element may be locked by a pneumatically operated device indicated generally at 92 to hold the weighing element stationary while the weighed load is released from the receptacle. As herein shown, the receptacle 24 is provided with a bottom closing gate 94 having a slotted pivotal connection to a pin 96 mounted on receptacle 24. The gate 94 is held in its closed position by a spring 100 connected to a pin 98 also secured to the receptacle 24. An extension 102 from the gate is arranged to be engaged by a roller 104 carried by an arm 106 fast on a rocker shaft 108. A second arm 110 fast on the rocker shaft is connected by a link 112 to a cam lever 114 having a roll 116 cooperating with a cam 142 fast on the cam shaft 120. Upon opening of the gate the material is guided by a funnel 122 into a container 124 supported upon a conveyor belt 126. The cam shaft corresponds to the cam shaft 132 shown in Fig. 1 of Patent No. 2,704,197, and is arranged to be controlled to make one revolution each cycle of operation of the weighing machine. As herein shown, the cam shaft 120 may be driven through connections including a one revolution clutch, indicated generally at 146 in Figs. 2 and 5, arranged to be actuated through connections from the weighing units as will be hereinafter described. It will be understood that the multi-unit weighing machine includes a plurality of weighing units, such as shown in Fig. 1, arranged side by side, each unit operating independently to perform its individual weighing operation, and all units having controls in common for simultaneously releasing their loads and resetting the weighing units for a succeeding weighing cycle. The driving member of the one revolution clutch 146 may be continuously driven through any usual or preferred driving means, such as an electric motor as illustrated and described in the Howard patents to which reference may be made.

As indicated in Fig. 1, the multi-unit weighing machine is provided with dual conveying mechanism comprising conveyor belts 126, 128 for advancing two groups of containers into operative position to receive the weighed loads, some of the funnels 122 being arranged to guide the material from one set of weighing units into one group of containers 124, and the other remaining funnels 123 being arranged to guide the material from a second set of weighing units into the second group of containers 125. The conveying mechanism indicated herein may be separately driven and controlled by the operation of the weighing units to operate in timed relation to the operation of the weighing machine to advance a group of containers into operative position to be filled and to release the filled containers to be discharged from the machine in a manner similar to that shown in the Stanley R. Howard Patent No. 2,364,902 to which reference may be made. Upon release of the material from the receptacles the gates 94 are immediately closed by the spring 100 because of the shape of cam 142. By reference to the Howard Patent No. 2,364,902 it will be seen that the conveyor transfer belt may be continuously driven through separate driving means and that the containers are advanced in groups corresponding to the number of weighing units, the containers being separated into such groups from a line of containers by cam operated stops arranged to release one group to be advanced into engagement with a stop for aligning the group beneath the funnels in timed relation to receive weighed loads released from the weighing units. Thereafter, the filled group of containers is released and a new group of containers is advanced into alignment with the funnels to receive the subsequently weighed loads. The conveyor cam shaft may be driven through connections from the main cam shaft, or as shown in Patent No. 2,364,902, the conveyor cam shaft may be separately driven through connections from a second one revolution clutch which may be controlled by the weighing units to drive the cam shaft one revolution each cycle of operation upon completion of the weighing operations of all of the units. It will be understood that each conveyor belt 126, 128 in the illustrated embodiment of the invention may be similarly driven, and the groups of containers may be similarly advanced and controlled in the manner above described.

Provision is then made for resetting the material cutoff shutter 26 to its open and latched position, and as shown in Fig. 1, the rocker shaft 30 is provided with an arm 130 fast thereon and connected by a link 132 to one arm 134 of a bell crank pivotally mounted at 136, the second arm 138 carrying a roller 140 cooperating with a cam 118 fast on the cam shaft 120. Upon rocking of the shutter shaft 30 in a counterclockwise direction an arm 144 also fast thereon engages the shutter arm 28 to rock it to an open position. It will be understood that in a multi-unit machine a resetting arm 144 is provided for each shutter and rocking of the shaft 30 operate to reset all of the shutters simultaneously. During the shutter opening movement the hook member 36 engages and passes beyond the roller 38 to rock the latch arm 40 in a counterclockwise direction, the arm and roller returning to a position in the path of the hook member by virtue of the spring 50 to latch the shutter in its open position. It will be seen that opening of the shutter will also effect closing of the switch 90 to again start vibration of the feeder 14 for a succeeding weighing operation. In practice the weighing element 25 may remain in its locked position until the accumulated material in the hopper 22 is deposited in the receptacle 24 and is then unlocked to receive the stream of material flowing from the feeder 14 and to perform the weighing operation. In a modified form of control for the vibratory feeder 14 a cam operated switch, not shown, may be provided for starting the feed a short time before the shutter is opened so as to form an accumulation of material in the hopper 22 to be released into the receptacle when the shutter is subsequently opened.

In the operation of a multi-unit weighing machine each weighing unit is adjusted to perform its individual weighing operation in a predetermined time within a cycle of operation of the cam shaft 120, and during each cycle of operation the receptacles 24 are first opened to release their previously weighed loads into the containers supported therebelow. Upon reclosing the receptacle gates 94 the shutters 26 are reset to their latched position, and the vibratory feeders are started to deliver material into their respective receptacles 24 to perform the weighing operations. During this time the previously filled containers are discharged from the machine and a new group of containers are advanced into filling position. As each weighing unit completes its weighing operation its individual latch mechanism 32 is released to cut off the stream of material to its receptacle. During normal operation all of the weighing units will have completed their weighing operations within a predetermined time in the cycle of operation of the cam shaft 120 so that all of the receptacles 24 may be opened at once to release their weighed loads into the containers at the start of a succeeding cycle of operation.

Figure 2:
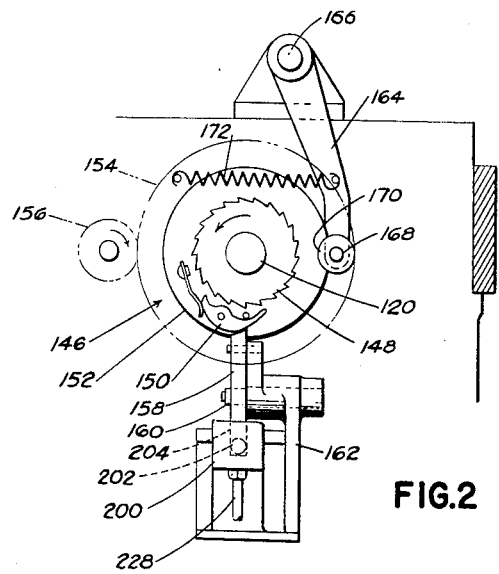
Fig. 2 is a side elevation of a one revolution clutch embodying the present control means.

As shown in Figs. 2 and 5, the above sequence of operations may be controlled by the one revolution clutch indicated generally at 146 operatively connected to the cam shaft 120. The one revolution clutch includes a ratchet 148 mounted to rotate on the cam shaft 120, and a spring pressed pawl 150 cooperating with the ratchet is pivotally mounted in a pawl carrier disk 152 fast on the cam shaft. The ratchet is formed integrally with a gear 154 in mesh with a drive pinion 156 which may be driven by an explosion-proof electric motor, not shown, or other primary source of power, such as illustrated in the Howard Patent No. 2,364,902. A pawl stop 158 is pivotally mounted on a stud 160 supported in a bracket 162 and is arranged to be moved into the path of the tail of the pawl to disengage the same from the ratchet, the pawl being free to engage the ratchet when the pawl stop is moved out of the path of the pawl. As also shown in Fig. 2, an arm 164 pivotally mounted at 166 is provided with a roller 168 for cooperation with a cutout portion 170 of the pawl carrier disk 152. A spring 172 is arranged to urge the roller into engagement with the cutout portion to hold the cam shaft 120 in a predetermined stopped position comprising the start of a cycle of operation. A second pawl and ratchet, not shown, may be provided to prevent reverse rotation of the cam shaft 120.

From the description thus far it will be seen that in the operation of a multi-unit weighing machine, wherein the weighing units are arranged side by side with the shutter shaft 30 common to all of the units, all of the shutters 26 which are pivotally mounted on the shaft 30 are open at the start of a cycle of operation, and the vibratory feeders 14 are in operation to deposit streams of material into the receptacles 24. Each weighing unit is individually operated to release its shutter 26 to cut off the material when the load of material deposited in its receptacle 24 reaches a predetermined weight, such release being effected through the pneumatically controlled units 60, 64 and the latch mechanism 32 as described. Rocking of each individual shutter arm 28 also effects stopping of its vibratory feeder 14 through the connections 86, 88 controlling its individual vibratory feeder switch 90. It will be understood that during the weighing operations the cam shaft 120 is being rotated through its cycle of operation and that the individual weighing operations are normally completed prior to the end of the cycle of rotation of the cam shaft 120.

However, in order to assure that all of the weighing units have completed their weighing operations within such predetermined cycle of rotation of the cam shaft 120, air actuated control means is provided which is rendered operative to maintain the pawl 150 and ratchet 148 of the one revolution clutch 146 in continuous engagement when the weighing units complete their weighing operations within the prescribed time cycle, and operative to disengage the pawl 150 from its ratchet to stop the shaft 120 in the event that one or more of the weighing units have failed to complete their weighing operations within such time. The air actuated control means is actuated by connections from the weighing units and includes a compressed air control circuit having an air valve member 248, as shown in Figs. 1 and 5, and an air cylinder 200, the latter having a piston 202 arranged to cooperate with the pawl stop 158 of the one revolution clutch 146. In general the valve member 248 is connected to a rocker shaft 256 common to all of the weighing units and spring urged in a counterclockwise direction viewing Fig. 1. A plurality of individual shutter detecting arms 262, one for each weighing unit, are arranged to cooperate with the shutters in a manner such that when all of the shutters are closed, the shaft 256 will be permitted to rock to actuate the valve 248 to close the same and thus through the air operated connections to be described permit continuous engagement of the pawl and ratchet of the one revolution clutch 146 for a succeeding cycle. However, in the event that one or more shutters fails to close within the cycle of operation, its detecting arm 262 will be held to prevent rocking of the shaft 256, and as a result the valve 248 will remain open, and the pawl stop 158 will be rocked into the path of the pawl 150 to discontinue rotation of the cam shaft 120.

Referring now to Fig. 5, the novel air actuated control means diagrammatically illustrated therein includes an air cylinder 200 provided with a piston 202 arranged to engage the depending arm 204 of the pawl stop 158 to rock the pawl stop out of engagement with the pawl to thus permit operative engagement of the one revolution clutch 146 and cycling of the cam shaft 120 as shown in full lines in Fig. 5. A spring 206 connected to the pawl stop 158 is arranged to effect rocking of the stop into the path of the pawl, as shown in dotted lines in Fig. 5, when the air pressure in the cylinder 200 is reduced to permit retraction of the piston 202. It will be understood that during normal operation of the weighing machine the air pressure is on to the air cylinder 200 to permit continuous rotation or cycling of the cam shaft 120 at a uniform speed to perform successive weighing operations as long as the weighing operations are all completed within a predetermined time during each cycle and the containers are advanced into filling position. However, in the event that one or more weighing units fail to complete their weighing operations within such predetermined time or in the event that the containers are not advanced into operative position to receive the weighed loads because of a depletion in the supply of containers or other causes, provision is made for effecting a reduction in the air pressure to the cylinder 200 and engagement of the pawl stop 158 with the pawl to temporarily discontinue cycling of the machine until such time as all the weighing operations are completed and the containers are advanced into filling position.

As illustrated in Fig. 5, the air actuated control circuit includes a main air supply pipe 208 which may be connected to a source of compressed air and which passes through an air pressure regulator 210 and air gauge 212 for regulating the control circuit air pressure. The regulated air then passes through a lubricator 214. One branch 216 of the air circuit leading from the supply pipe 208 is connected to the inlet of a manually operated valve 218 having a handle 220 shown in its open position to permit air to pass through the outlet and into line 222 to the inlet of a pilot valve 224. The pilot valve is provided with a spring pressed plunger 226 normally held in its open position, as shown, to permit the air to pass through passageway 227, line 228 and flow control valve 230 to the air chamber of the control cylinder 200 which causes the piston 202 to be extended and to rock the pawl stop 158 out of the path of the one revolution clutch. The flow control valve 230 may be adjusted so as to prevent a sudden surge of compressed air to the cylinder 200 which might cause excessive wear or damage to the pawl stop. However, the flow control valve 230 is designed to permit rapid escape of the air from the cylinder when the air pressure is cut off by the pilot valve 224 so that it will not retard the rapid retraction of the piston 202 and rocking of the pawl stop 158 to disengage the one revolution clutch. It will be understood that in practice the pilot valve 224 may be of conventional structure and provided with an exhaust port, as shown, for permitting escape of the air trapped in the line 228 when the pilot valve 224 is closed to cut off the air, so that the piston 202 may be rapidly retracted.

A second branch line 232 leading from the main supply line 208 is connected to the inlet chamber of a cam operated master safety valve or timing valve 234 which is provided with a spring pressed valve stem 236 shown in its closed position. A cam lever 238 pivotally connected to the valve 234 is provided with a roller 240 cooperating with a timing cam 242 fast on the cam shaft 120 as diagrammatically indicated in Fig. 5. The cam lever 238 is arranged to engage the upper end of the valve stem to effect depression and opening of the valve when the high spot 244 of the cam 242 engages the roller 240, and in practice the cam is adjusted on the cam shaft relative to the cyclical operation of the machine so that the valve 236, normally open when the machine is idle, is permitted to close by the cam as soon as the cam shaft begins a cycle of operation and is not reopened until a fractional interval of time, as for example about .2 of a second, prior to the end of each cycle of operation. The outlet chamber of the timing valve 234 is connected by an air line 246 to a slow weight detecting valve 248 shown in its open position in Fig. 5 and which is arranged to be closed when all of the weighing units have completed their weights and the shutters 26 have closed. As illustrated in Fig. 1, the slow weight detecting valve 248 is provided with an operating arm 250 connected by a link 252 to a lever 254 fast on a shaft 256. The lever 254 is urged in a valve closing direction by a spring 258 and is limited in its rocking movement by a stop screw 260. The shaft 256 is also provided with a plurality of shutter actuated detecting arms 262 fast thereon, one arm being provided for each weighing unit and individually actuated by its shutter. Each shutter arm 28 is further provided with a second arm 264 (see Fig. 3) carrying a roller 266 similar to the arm and roller 86, 88 respectively, and disposed in spaced relation as shown in Fig. 3. The second arm and roller 264, 266 carried by each shutter unit is arranged to engage and rock the detecting arms 262 to the upraised position shown in Fig. 1 when the shutters are reset to their latched position and to thus rock the lever 254 in a direction to open the single slow weight detecting valve 248. Thereafter, as each weighing unit completes its weighing operation its shutter will close, removing its roller 266 from the path of its respective detecting arm 262. The rollers 266 of the weighing units which have not completed their weighing operations will remain in engagement with their detecting arms 262 preventing rocking of the shaft 256, and when the last weighing unit has completed its operation and its shutter roller 266 is removed from the path of its detecting arm 262 the shaft 256 will be permitted to rock in a counterclockwise direction to effect rocking and closing of the slow weight detecting valve 248. Thus, during the normal operation of the machine, when all of the weighing operations have been completed within a predetermined time in each cycle of operation, that is, within .2 of a second prior to the end of each cycle, the detecting valve 248 will be closed, so that when the timing valve 234 is opened no air will pass through the valve 248. As a result, the pilot valve 224, which is normally open, will permit air to pass from the line 222 through passageway 227 and line 228 to the cylinder 200 to maintain the piston 202 in its extended position wherein the pawl stop 158 is rocked out of the path of the pawl 150. However, in the event that one or more of the weighing units has failed to complete its weighing operation within such predetermined time, the slow weight detecting valve 248 will be open when the timing valve 234 is opened, and when this occurs the air may pass through the detecting valve 248, air line 268, flow control valve 270 and air line 272 to the pilot valve 224 to effect shifting of the spring pressed plunger 226 to the right. Thus, the air from the line 222 to the air cylinder 200 will be cut off, and as a result the piston 202 will be retracted to permit the pawl stop 158 to disengage the one revolution clutch and discontinue the operation of the machine. Thereafter, when the slow acting weighing unit or units subsequently complete their weights, the detecting valve 248 will be closed to permit the spring pressed plunger 226 of the pilot valve 224 to be retracted, thus opening the air line to the air cylinder 200 to extend the piston 202 and rock the pawl stop 158 out of the path of the pawl 150 to again initiate cycling operation of the machine.

When a slow weighing operation is detected it is the duty of the operator to adjust the rate of feed from the vibratory feeder 14 so as to correct the slow acting condition, and in order to apprise the operator of a slow acting weighing unit the pilot valve 224 is provided with a second air line 274 which is opened to the compressed air line 222 through the pilot valve when the plunger 226 is caused to move to the right to close the air supply to the cylinder 200. As herein shown, the second line 274 is connected to an air cylinder 276 provided with a plunger 278 arranged to extend through an opening in a panel 280 of the machine to indicate to the operator that a slow weighing condition exists. The indicating plunger 278 will be retracted when the pilot plunger 226 is permitted to return to its normal position, to the left as shown in Fig. 5.

The flow control valve 270 in the air line 268 from the slow weight detecting valve 248 to the pilot valve 224 permits free passage of the air through the line to the pilot valve, and the needle valve 282 in the flow control valve may be adjusted to permit restricted bleeding of the air in the pilot line so that the spring 225 in the pilot valve will be able to shift the plunger 226 back to its normal operating position when the slow weight detecting valve is closed.

In the normal operation of the machine the slow weight detecting valve 248 will always close before the timing valve 234 opens so that the one revolution clutch 146 will not be disengaged and the cam shaft 120 will continue its rotation through successive cycles. When a slow weight occurs the cam shaft will come to rest at the end of its cycle and will again start its rotation when the slow weighing unit completes its weight.

The air actuated control circuit thus far described, as shown in Fig. 5, is arranged to discontinue the weighing operations in the event that one or more weighing units have failed to complete their weights within a predetermined time and to apprise the operator to correct the condition by adjusting the rate of feed or other fault causing the slow weighing operation. As above described, when the weighing operations of all of the units are completed within the predetermined time cycle of the shaft 120, the start of a new cycle will first effect release of the weighed loads from their receptacles 24 through the cam operated connections 102, 104, the loads being guided through the funnels 122, 123 into their respective groups of containers 124, 125 which have been brought to rest therebeneath on the conveyers 126, 128 as described. After a predetermined time, sufficient to empty the loads into their containers, the gates 94 of the receptacles 24 are permitted to close by the cam 142, and the filled containers are permitted to advance on their conveyers whereupon new groups of containers are advanced and brought to rest under their respective funnels by the cam operated stop mechanism controlled by the weighing units as shown and described in the Howard Patent No. 2,364,902. Upon closing of the gates 94, the cam 118 operated to reset all of the shutters 26, detecting arms 262, and to start the vibratory feeders 14, as described, to initiate a new weighing operation. It will be understood that the new groups of containers are being brought into position during the weighing operations and are normally in position to receive their loads prior to the end of the weighing operations.

In accordance with another feature of the invention, as also shown in Fig. 5, in order to assure that new groups of containers are advanced into position to receive the subsequently released loads at the end of the weighing operations provision is also made in the present air actuated control circuit for discontinuing the operation of the weighing machine in the event that the supply of containers being advanced on the conveyers 126, 128 is depleted and a new group or groups of containers fails to be advanced into filling position prior to the end of a cycle of operation. As herein shown, the container control safety mechanism includes a valve block 300 operatively connected to the compressed air line 208 by a line 302. The compressed air first passes through a flow control valve 304 and then enters a metering chamber 306 having a restricted opening communicating with a central passageway 308 and laterally extended passageways 310, 312. The passageways 310, 312 communicate with ball vent valves 314, 316 respectively which are arranged to cooperate with container detecting arms 318, 320. The detecting arms are mounted on trunnion shafts 322, 324 and are urged by springs 325 into the path of the incoming containers on the dual conveyer belts 126, 128. The hubs 326 of the detecting arms which cooperate with the ball vent valves are shaped eccentrically in a manner such that when the arms are engaged by the incoming containers the ball vent valves may move to their closed position so that a pressure is built up in the valve block passageways. As shown in Fig. 5, the valve block 300 is also connected by passageway 327 and line 328 to a second pilot valve 330 having a spring pressed plunger 332 operating therein and which is normally held in its closed position relative to a port 334 in the pilot valve by the pressure built up in the valve block 300. The second pilot valve 330 is connected to the timing valve 234 by lines 336 and 246 and is also connected through port 334, line 338, check valve 340 and line 272 to the first pilot valve 224.

In operation so long as the detecting arms 318, 320 are engaged by the incoming containers, the pressure in the valve block 300 will hold the plunger 332 in the pilot valve 330 in its closed position so that when the timing valve 234 is opened .2 of a second prior to the end of each cycle of operation, the air from the timing valve cannot pass through the second pilot valve 330 to operate the first pilot valve 224. However, in the event that the containers on one or both conveyer belts 126, 128 are depleted one or both container detecting arms 318, 320 will swing outwardly to effect depression of its respective ball vent valve to permit the air to escape and reduce the pressure in the valve block 300. As a result, the spring pressed plunger 332 will be urged to the left to open the port 334, and when the timing valve 234 opens compressed air will be permitted to pass through the second pilot valve 330 to effect closing of the first pilot valve 224. Thus, the air cylinder 200 will be operated to permit the pawl stop 158 to disengage the one revolution clutch and bring the cam shaft 120 to rest. Thereafter, when a new supply of containers is provided closing of the ball vent valves 314, 316 will again build up the pressure in the valve block 300 to effect closing of the port 334 in the pilot valve 330 and thus permit the pilot valve 224 to be opened to effect retraction of the pawl stop 158 and again initiate cycling operation of the machine. However, in practice the metering chamber 306 is designed to retard the pressure build up in the valve block 300 to serve in effect as a time delay so that the passage of a single container, for example, will not permit a sufficient pressure increase in the valve block to effect shifting of the plunger 332, thus assuring that a full group of containers is advanced into filling position before the pilot valve 330 can be operated to permit rocking of the pawl stop and engagement of the one revolution clutch to start the machine. The time delay may be varied by adjusting the needle valve 342 in the flow control valve 304. It will be observed that operation of the pilot valve 224 in response to a depletion of the containers as detected by the valve block 300 will also effect projection of the plunger 278 of the air cylinder 276 to apprise the operator of an abnormal condition so that he may replenish the supply of containers.

Upon discharge of the filled containers from the weighing machine the containers are delivered to an associated machine in the packaging line, such as a top closing and sealing machine, and in the preferred embodiment of the machine provision is also made for interrupting cycling of the weighing machine in the event that such associated machine is stopped so as to prevent a jam of filled containers between the two machines. As herein shown, a normally closed discharge safety valve 344 supplied with compressed air through a pipe 346 is provided with a lever 348 having a roller 350 arranged to cooperate with a cam piece 352 which may be actuated by connections to the clutch lever of the associated machine in the line. The valve 344 is connected by a line 354, check valve 356 and line 272 to the pilot valve 224, and in operation when the clutch of the associated machine is disengaged to stop the machine the cam piece 352 will be moved to effect rocking of the lever 348 and depression of the valve stem 358 to open the air line to the pilot valve 224 and effect stopping of the weighing machine as above described. Movement of the clutch lever to engaging position will again permit closing of the valve 344 to permit starting of the weighing machine.

It will be understood that the flow control valves 270, 340, 356, herein shown, are all arranged to permit the flow of air in one direction only. Flow control valve 270 also serves to permit a limited bleed back of air from the pilot valve 224 so that when no air pressure occurs in the line 272 from any of the control valves the pressure will drop in line 272 and permit the spring 225 to shift the plunger 226 to the left. Provision may also be made in the valve units illustrated for relieving the air trapped in the lines between adjacent units when the air is cut off from such lines, and may include relief ports, as shown, operative when the valve units are closed.

It will also be seen that in the event of failure of the regulated compressed air supply at its source such failure will permit retraction of the piston 202 of air cylinder 200 which in effect provides an additional safety feature to stop the machine in the event of such failure.

From the above description it will be seen that the present multi-unit automatic weighing machine, provided with novel air actuated control mechanism, is arranged to discontinue operation of the machine in the event that all of the weighing units have not completed their weighing operations within a predetermined time in each cycle of operation, or in the event that the supply of containers is depleted so that a new group of containers fails to be advanced into operative position to receive the previously weighed loads within said predetermined time. It will also be observed that the air actuated mechanism for detecting the absence of containers is provided with a pneumatic time delay preventing starting of the machine by the passage of a single container whereby to assure advance of a full group of containers into load receiving position before the machine may be started. It will also be seen that the present air actuated control mechanism is arranged to automatically discontinue the operation of the weighing machine in the event that an associated machine is stopped, and that failure of the compressed air supply will also effect discontinuance of operation of the weighing machine.

While the preferred embodiment of the invention has been herein illustrated and described, it will be understood that the invention may be embodied in other forms within the scope of the following claims.

Having thus described the invention, what is claimed is:

1. In a multi-unit automatic weighing machine operating in successive cycles, in combination, a plurality of weighing units, driving means including a cam shaft and a one revolution clutch connected to the cam shaft operative to drive the shaft in successive continuous cycles of predetermined length, and air actuated control means operatively connected between the weighting units and said clutch for temporarily disengaging the clutch to temporarily discontinue cycling of the cam shaft in the event that all of the weighing units have not completed their weighing operations within a predetermined time prior to the end of each cycle of rotation of the cam shaft, said air actuated control means comprising an air circuit including an air cylinder and piston cooperating with said clutch and arranged to normally maintain the clutch in its engaged position, a normally open weigher safety valve responsive to and arranged to be closed upon completion of all of the weighing operations, and means responsive to the passage of air through said weigher safety valve immediately prior to the completion of each cycle of operation to cut off the air to said cylinder to permit movement of said piston to disengage said clutch.

2. A multi-unit automatic weighing machine as defined in claim 1 wherein rotation of the shaft and continuation of the cycling operation is again initiated upon subsequent completion of all said weighing operations.

3. In a multi-unit automatic weighing machine operating in successive cycles, in combination, a plurality of weighing units, driving means including a cam shaft and a one revolution clutch connected to the cam shaft operative to drive the shaft in successive continuous cycles of predetermined length, and air actuated control means operatively connected between the weighing units and said clutch for disengaging the clutch to temporarily discontinue cycling of the cam shaft in the event that all of the weighing units have not completed their weighing operations within a predetermined time prior to the end of each cycle of rotation of the cam shaft, said one revolution clutch including a pawl and ratchet having a pawl stop, said air actuated control means including an air circuit having an air cylinder and piston cooperating with said pawl stop, a normally open weigher safety valve responsive to and arranged to be closed upon completion of all of the weighing operations, a cam operated timing valve arranged to be opened immediately prior to the end of each cycle of operation to pass air through said safety valve, and means responsive to said passage of air through said weigher safety valve to cut off the air to said cylinder to permit movement of said pawl stop to disengage said pawl and ratchet clutch in the event that all of the weighing units have not completed their weighing operations within said predetermined time.

4. A multi-unit automatic weighing machine as defined in claim 3 wherein said means responsive to the passage of air through the safety valve comprises a normally open pilot valve having a separate air line to said cylinder and having a spring pressed shiftable member arranged to be closed by said air passage through the safety valve whereby to cut off the air to said cylinder to discontinue the cycling operation when said weighing operations are not completed within said predetermined time.

5. A multi-unit automatic weighing machine as defined in claim 4 which includes an air actuated signal operatively connected to said pilot valve to indicate to the operator that the weighing operations are not being completed within said predetermined time.

6. In a multi-unit automatic weighing machine operating in successive cycles, in combination, a plurality of weighing units, means for advancing a group of containers from a supply thereof into operative position to receive the weighed loads from said weighing units each cycle of operation, driving means including a cam shaft and a one revolution clutch connected to the cam shaft operative to drive the shaft in successive continuous cycles of predetermined length, and air actuated control means operatively connected between the container supply and said clutch for disengaging the clutch to temporarily discontinue cycling of the cam shaft in the event that a group of containers has not been advanced into said operative position within a predetermined time prior to the end of each cycle of rotation of the cam shaft, said air actuated control means comprising an air circuit including an air cylinder and piston cooperating with said clutch, a container safety valve responsive to the supply of containers being advanced, a normally closed control valve cooperating with said container safety valve arranged to be opened to permit the passage of air therethrough in the event that the safety valve detects the absence of containers being advanced, and means responsive to said passage of air through the control valve to cut off the air to said cylinder to effect disengagement of said clutch.

7. A multi-unit automatic weighing machine as defined in claim 6 wherein rotation of the shaft and the cycling operation is again initiated upon subsequent advance of a group of containers into said operative position.

8. In a multi-unit automatic weighing machine operating in successive cycles, in combination, a plurality of weighing units, means for advancing a group of containers from a supply thereof into operative position to receive the weighed loads from said weighing units each cycle of operation, driving means including a cam shaft and a one revolution clutch connected to the cam shaft operative to drive the shaft in successive continuous cycles of predetermined length, and air actuated control means operatively connected between the container supply and said clutch for disengaging the clutch to temporarily discontinue cycling of the cam shaft in the event that a group of containers has not been advanced into said operative position within a predetermined time prior to the end of each cycle of rotation of the cam shaft, said one revolution clutch including a pawl and ratchet having a pawl stop, said air actuated control means including an air circuit having an air cylinder and piston cooperating with said pawl stop, a container safety valve responsive to the supply of containers being advanced, a normally closed control valve cooperating with said container safety valve arranged to be opened in the event that the safety valve detects the absence of containers being advanced, a timing valve arranged to be opened immediately prior to the end of each cycle of operation to pass air through said open control valve, and means responsive to said passage of air through the control valve to cut off the air to said cylinder to effect movement of said pawl stop and disengagement of said clutch in the event that a group of containers fails to be advanced into said operative position within said predetermined time prior to the end of each cycle of operation.

9. A multi-unit automatic weighing machine as defined in claim 8 wherein the container safety valve comprises a valve block having a pressure chamber normally under pressure to maintain said control valve closed when the containers are advanced and arranged to be vented to reduce said pressure when the containers are absent, said valve block having air metering means through which the air must flow for a predetermined time to build up a pressure in said chamber and comprising in effect a time delay so that the advance of a single container will not effect closing of the control valve to start the cycling operation of the cam shaft whereby to assure advance of an entire group of containers before the cycling operation is again initiated, and means for adjusting said metering means to vary said time delay.

10. A multi-unit automatic weighing machine as defined in claim 9 wherein the means responsive to said passage of air through the control valve comprises a normally open pilot valve arranged to be closed by said passage of air to cut off the air to said cylinder to discontinue the cycling operation when said containers are not advanced within said predetermined time, and an air actuated signal operatively connected to said pilot valve to indicate to the operator that the containers are not being advanced within said predetermined time.

11. A multi-unit automatic weighing machine operating in successive cycles having, in combination, a plurality of weighing units, means for advancing a group of containers from a supply thereof into operative position to receive the weighed loads from said weighing units, a one revolution cam shaft, driving means including means operative to drive the cam shaft in successive continuous cycles, and air actuated control means operatively connected between said weighing units and said driving means, and between said container advancing means and said driving means for discontinuing cycling of the shaft in the event that all of said weighing units have not completed their weighing operations within a predetermined time in each cycle of operation, or in the event that a group of containers has not been advanced into said operative position within said predetermined time, said driving means including a one revolution pawl and ratchet clutch operatively connected to said one revolution cam shaft and having a pawl stop, said air actuated control means including an air circuit having an air cylinder and piston cooperating with said pawl stop, and a normally open pilot valve arranged to be closed in the event of failure of one or more weighing units to complete their weights within a predetermined time or in the event that a group of containers has not been advanced into said operative position within said predetermined time whereby to cut off the air to said piston to permit movement of the pawl stop to disengage said pawl and ratchet clutch and discontinue rotation of the cam shaft.

12. A multi-unit automatic weighing machine as defined in claim 11 wherein the air circuit includes air actuated signal means operatively connected to said pilot valve to indicate to the operator that an abnormal condition occurs.

13. A multi-unit automatic weighing machine as defined in claim 11 wherein the weighing machine comprises one of a line of machines operative upon the containers, and wherein the air actuated control means includes a normally closed line safety valve operatively connected to said pilot valve, said line safety valve being adapted to be opened to effect closing of said pilot valve and disengagement of said clutch in the event that an associated machine in the line is stopped.

14. A multi-unit automatic weighing machine as defined in claim 11 wherein the air actuated control means includes a cam operated timing valve arranged to be opened by a cam on said cam shaft immediately prior to the end of a cycle of operation, a slow weight detecting valve, and a container control safety valve in series with said timing valve and said pilot valve.

References Cited in the file of this patent

UNITED STATES PATENTS

| | | |
|---|---|---|
| 607,469 | Richards | July 19, 1898 |
| 675,676 | Phillips | July 26, 1904 |
| 2,098,905 | Westin | Nov. 9, 1937 |
| 2,109,063 | Garbell | Feb. 22, 1938 |
| 2,116,895 | Howard | May 10, 1938 |
| 2,137,334 | Dorrington | Nov. 22, 1938 |
| 2,157,577 | Schroeder | May 9, 1939 |
| 2,290,103 | Hohl et al. | July 14, 1942 |
| 2,364,902 | Howard | Dec. 12, 1944 |
| 2,559,117 | Falk | July 3, 1951 |
| 2,704,197 | Howard | Mar. 15, 1955 |
| 2,831,300 | Schroeder | Apr. 22, 1958 |
| 2,838,176 | Pettis | June 10, 1958 |